US010697732B2

(12) United States Patent
Pniel et al.

(10) Patent No.: US 10,697,732 B2
(45) Date of Patent: Jun. 30, 2020

(54) SYSTEM AND METHOD FOR DISPLAYING AN AIMING VECTOR OF A FIREARM

(71) Applicant: MEPROLIGHT (1990) LTD., Or-Akiva (IL)

(72) Inventors: Zeev Pniel, Petah Tiqva (IL); Omer Korech, Pardes-Hana (IL)

(73) Assignee: MEPROLIGHT (1990) LTD, Or-Akiva (IL)

( * ) Notice: Subject to any disclaimer, the term of this patent is extended or adjusted under 35 U.S.C. 154(b) by 0 days.

(21) Appl. No.: 16/550,230

(22) Filed: Aug. 25, 2019

(65) Prior Publication Data
US 2020/0141695 A1 May 7, 2020

(30) Foreign Application Priority Data

Sep. 3, 2018 (IL) .......................................... 261556

(51) Int. Cl.
*F41G 1/01* (2006.01)
*F41G 11/00* (2006.01)
*G02B 27/01* (2006.01)
*F41G 1/34* (2006.01)

(52) U.S. Cl.
CPC .............. *F41G 1/01* (2013.01); *F41G 11/001* (2013.01); *F41G 1/345* (2013.01); *G02B 27/0101* (2013.01)

(58) Field of Classification Search
CPC ... F41G 3/16; F41G 3/00; F41G 3/005; F41G 3/14; F41G 1/00
See application file for complete search history.

(56) References Cited

U.S. PATENT DOCUMENTS

| 4,619,616 | A | | 10/1986 | Clarke |
| 5,641,288 | A | | 6/1997 | Zaenglein, Jr. |
| 5,649,871 | A | | 7/1997 | Ryan |
| 5,675,112 | A | | 10/1997 | Giry et al. |
| 5,806,229 | A | * | 9/1998 | Daz ........................... F41G 3/16 42/105 |

(Continued)

FOREIGN PATENT DOCUMENTS

| EP | 2577213 B1 | 10/2015 |
| WO | 95/16929 A1 | 6/1995 |
| WO | 2012/058453 A2 | 5/2012 |

OTHER PUBLICATIONS https://www.youtube.com/watch?v=Xp62vaK4LR0.

*Primary Examiner* — J. Woodrow Eldred
(74) *Attorney, Agent, or Firm* — Soroker Agmon Nordman (57) ABSTRACT

A system and method for displaying an aiming vector of a firearm to a user, including: at least one illuminating source, positioned along a longitudinal axis of a barrel of the firearm and at least one light sensor, mounted onto a headgear at a predetermined position, and configured to detect light parameters from the at least one light source, and a processor, configured to: (i) receive the detected light parameters of the at least one illuminating source (ii) determine a location of the at least one illuminating source, based on the detected light parameters, and (iii) generate an aiming vector of the firearm based on the location of the at least one illuminating source with respect to the predetermined position of the at least one light sensor. A display unit mounted onto a headgear is configured to display the aiming vector generated by the processor.

20 Claims, 7 Drawing Sheets

(56) References Cited

U.S. PATENT DOCUMENTS

| | | |
|---|---|---|
| 8,678,282 B1 * | 3/2014 | Black .................... F41G 3/16 |
| | | 235/13 |
| 8,997,393 B2 | 4/2015 | Bar Yona |
| 9,593,906 B1 | 3/2017 | Oz et al. |
| 9,857,143 B2 | 1/2018 | Teetzel et al. |
| 9,897,415 B2 | 2/2018 | Zhang et al. |
| 2002/0160840 A1 | 10/2002 | Morkris et al. |
| 2009/0040308 A1 | 2/2009 | Temovskiy |
| 2009/0281765 A1 | 11/2009 | Deliwala |
| 2013/0169820 A1 | 7/2013 | Stewart |
| 2013/0333266 A1 | 12/2013 | Gose et al. |
| 2014/0319217 A1 | 10/2014 | Elefante |
| 2014/0349254 A1 | 11/2014 | Lohbihler |

* cited by examiner

SYSTEM AND METHOD FOR DISPLAYING AN AIMING VECTOR OF A FIREARM

FIELD OF THE INVENTION

The present disclosure generally relates to a firearm aiming system, and more specifically to a firearm aiming system that enables a user to aim at a target, while avoiding the need to align the firearm with the direct line of sight of the user.

BACKGROUND

During the past few decades, the firearm industry developed dramatically, while embracing many high-tech solutions, especially in the sighting and the precise shooting sector. In this sector, many developments were, and still are dedicated to enable a user of a firearm to better aim and hit remote targets, while doing so as quickly as possible. The most advanced solutions usually use optical and/or electroptical sights, reflex sights, holographic sights, cameras and/or night vision including gyroscopes and/or advanced communication systems, to generate an augmented reality onto a screen. However, most known aiming and/or sighting systems still require the user to hold the firearm in a "classic" position, i.e., holding the firearm close to the face of the user and aligning the firearm with the direct line of sight of the user.

SUMMARY

According to an aspect of some embodiments of the present disclosure there is provided a system for displaying an aiming vector of a firearm to a user, the system comprising: at least one illuminating source, positioned along a longitudinal axis of a barrel of the firearm, at least one light sensor, mounted onto a headgear at a predetermined position, configured to detect light parameters from the at least one light source, a display unit designed to be mounted onto the headgear, and a processor, configured to: (i) receive the detected light parameters of the at least one illuminating source, (ii) determine a location of the at least one illuminating source, based on the detected light parameters, and (iii) generate an aiming vector of the firearm based on the location of the at least one illuminating source with respect to the predetermined position of the at least one light sensor, wherein the display unit is configured to display the aiming vector generated by the processor.

Optionally, the system further comprises a second illuminating source positioned along a longitudinal axis of a barrel of the firearm, at a predetermined distance from the at least one illuminating source.

Optionally, the system further comprises a second light sensor mounted at a predetermined distance from the at least one light sensor onto a headgear, configured to detect light parameters from the at least one light source.

Optionally, the at least one illuminating source is an elongated illuminating source, positioned along a longitudinal axis of a barrel of the firearm.

Optionally, the at least one illuminating source has a distinctive form or structure such that the at least one light sensor is able to detect the form or structure of the at least one illuminating source.

Optionally, the light parameters include light intensity, light wavelengths, light, polarization, size, of illuminating source, shape of illuminating source, number of illuminating sources, light modulation or any combination thereof.

Optionally, the at least one illuminating source illuminates light at a wavelength between 900 nm and 1100 nm.

Optionally, the light wavelength of the at least one illuminating source is set by the user.

Optionally, the light intensity of the at least one illuminating source is set by the user.

Optionally, the light intensity of the at least one illuminating source is detected from a distance of at up to 10 meters.

Optionally, the processor is further configured to generate different aiming vectors based on different wavelengths of different illuminating sources.

Optionally, the display unit is further configured to display the different aiming vectors.

Optionally, the at least two light sensors are positioned on opposite sides of the headgear.

Optionally, the headgear is a helmet.

According to another aspect of some embodiments of the present disclosure, there is provided a method for displaying an aiming vector of a firearm to a user, the method comprising: positioning at least one light source along a longitudinal axis of a barrel of the firearm, positioning at least one light sensor onto a headgear at a predetermined position, detecting light parameters from the at least one illuminating source, receiving the detected light parameters of the at least one illuminating source, determining a location of the at least one illuminating source, based on the detected light parameters, generating an aiming vector of the firearm based on the location of the at least one illuminating source with respect to the predetermined position of the at least one light sensor, and displaying the generated aiming vector.

Optionally, the method further comprises positioning a second illuminating source along a longitudinal axis of a barrel of the firearm, at a predetermined distance from the at least one illuminating source.

Optionally, the at least one illuminating source is an elongated illuminating source, positioned along a longitudinal axis of a barrel of the firearm.

Optionally, the method further comprises positioning a second light sensor at a predetermined distance from the at least one light sensor.

Optionally, the second light sensor and the at least one light sensor are positioned at a predetermined distance from each other on opposite sides of the headgear.

Optionally, the light parameters include light modulation, light intensity, light wavelengths or any combination thereof.

Optionally, the at least one illuminating source illuminates light at a wavelength between 900 nm and 1100 nm.

Optionally, the method further comprises displaying a background image positioned in a line of sight of the user.

BRIEF DESCRIPTION OF THE DRAWINGS

Some non-limiting exemplary embodiments or features of the disclosed subject matter are illustrated in the following drawings.

In the drawings.

With specific reference now to the drawings in detail, it is stressed that the particulars shown are by way of example and for purposes of illustrative discussion of some embodiments of the disclosure. In this regard, the description taken with the drawings makes apparent to those skilled in the art how embodiments of the disclosure may be practiced.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described. References to previously presented elements are implied without necessarily further citing the drawing or description in which they appear.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

DETAILED DESCRIPTION

Some embodiments of the present disclosure provide a user of a firearm with the ability to acquire a target, aim at it and shoot the firearm without the need to hold the firearm in a "classic" position, which may require aligning the firearm, with the eyes of the user, i.e. direct line of sight, and the required target. As mentioned above, most known aiming systems are based on a traditional, i.e. "classic", way of aiming, which may include aligning a sight(s), which may be mounted onto a firearm, for example, as used by iron sights, with at least one eye of the user and the acquired target. In order to do so, in most cases, the user may be required to position the firearm in front of or in close proximity to their eyes. Most modern sighting systems usually use high-tech technological solutions such as augmented reality, telecommunication systems such as Wi-Fi and/or Bluetooth and/or the use of lasers to enable a user to acquire a target faster and to be more precise, then when using traditional iron sights. However, most of these systems still require the user to position the firearm in front of their face, specifically their eyes, and align the firearm and target with the line of site of the user. For example, in order for the user to aim at the target, they may still need to look through a screen displaying the augmented reality, which may be mounted onto the firearm, i.e., align their face with the firearm and the required target. Using lasers to point to the trajectory of the firearm may overcome the addressed problem, however, they may raise a new problem. For example, by using a laser pointing system, the user may reveal their position. While this may not be an issue in the privet sector, this may create a threat to a soldier positioned in a hostile environment. The use of telecommunication systems may enable a user to receive a visual target without the need to align the firearm with their eye(s) or reveal their location. However, these systems may be subject to communication jamming signals, which may not pose a problem in the privet sector, but may create a major problem to a soldier during combat.

Some embodiments in the present disclosure address these problems and provide a user the ability to aim at a target without positioning the firearm in front of their face, without revealing their position or using telecommunication systems or gyroscopes that may be subject to jamming, for example, by an enemy.

According to some embodiments, the system may display an aiming vector, for example on an augmented reality screen. The screen may be mounted onto a headgear, e.g., a helmet, a hat, a strap, a band, any other wearable upper torso, neck and/or head element or any combination thereof, which may eliminate the need to align the firearm with the face (e.g., eyes) of the user and the required target. By eliminating the need to align the firearm with the face of the user and the required target, the system may enable the user to fire the firearm by holding it in a variety of different positions. For example, the user may hold the firearm at a hip level, which may enable the user to shoot from the hip. Calculating and displaying the aiming vector may be possible due to the use of at least one illuminating, source, which may be mounted onto the firearm, and at least one light sensor, which may be substantially positioned at an eye level of the user. For example, the at least one illuminating source may be positioned along a longitudinal axis of the barrel of the firearm, i.e., parallel and along the barrel of the firearm. The at least one light sensor may be positioned onto the headgear at a predetermined position, for example, positioned to receive an indication from the front side of the user. The at least one light sensor may be configured to detect different light parameters, such as light wavelengths, light polarization, light intensity, light modulation, size of illuminating source, shape of illuminating source, number of illuminating sources or any combination thereof. The detected parameters may be analyzed, for example, by a processor and generated into a displayed aiming vector.

In some embodiments, two light sensors may be used, for example, a first sensor may be mounted onto a first side of the headgear and a second sensor may be mounted onto a second side of the headgear. In some embodiments, the two light sensors may be positioned on opposite sides of the headgear, such that they may be located on each side of the face of the user. In some embodiments, the system may use two illuminating sources to generate the aiming vector. Using at least one elongated illuminating source, e.g. at least 10 cm long, may be equivalent to the use of two point illuminating sources positioned at a predetermined distance of at least 10 cm apart from each other. This replacement may be possible since the system may be based on the three-dimensional view principal, for example, by using at least one light sensor and/or at least one light parameter, to generate the required aiming vector, as detailed below.

In some embodiments, the disclosed system may be mounted onto and/or used with a variety of firearms, such as, pistols and/or handguns, shotguns, assault rifles, light machineguns, machineguns or any other firearm, and may be used by law enforcement personnel, soldiers and/or by users in the private sector.

Some embodiments of the present disclosure may include a system, a method, and/or a computer program product. The computer program product may include a tangible non-transitory computer readable storage medium (or media) having computer readable program instructions thereon for causing a processor to carry out aspects of the present disclosure. Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including any object oriented programming language and/or conventional procedural programming languages.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Figure 1:
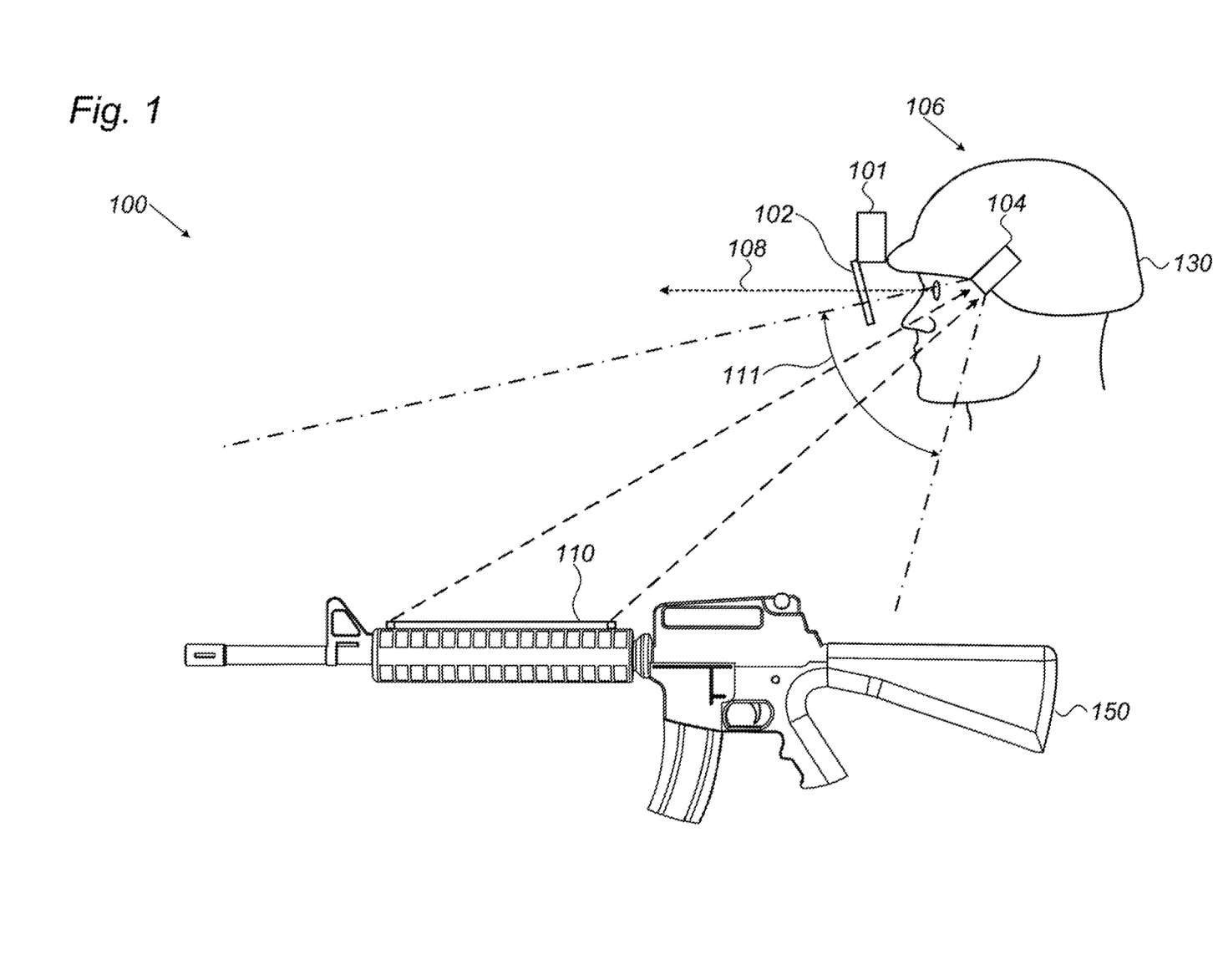
FIG. 1 is a schematic illustration of a side view of a system for displaying an aiming vector of a firearm, according to an embodiment of the present disclosure.

Reference is now made to FIG. 1, which is a schematic illustration of a side view of a system for displaying an aiming vector of a firearm, according to some embodiments of the present disclosure. In some embodiments, the system for displaying an aiming vector of a firearm may be, for example, system 100. In some embodiments system 100 may comprise a single illuminating source, e.g., illuminating source 110, which may be positioned along a longitudinal axis of a barrel of a firearm, such as firearm 150. For example, illuminating source 110, which may be an elongated illuminating source, may be positioned in parallel to the barrel of firearm 150, i.e., parallel to the firing trajectory of firearm 150. Illuminating source 110 may be mounted onto various elements of the firearm, e.g., as long as they remain visible to the at least one light sensor, for example: a barrel, an iron sight, a handguard, an upper and/or lower receiver and/or any combination thereof.

Using at least one elongated illuminating source, e.g., longer than 10 cm, may be similar, for example, to the use of two point illuminating sources, which may be positioned at a predetermined distance from each other (as will be detailed in FIG. 2), e.g. at a distance of 10 cm. For example, the at least one elongated illumining source 110 may be as long as 10 cm in order for a light sensor to detect each of the ends of the at least one elongated light source as a single point. The distance between two illuminating sources and/or the length of the elongated illuminating source may depend on the quality of the light sensor(s) used, e.g., on the sensitivity of the light sensor(s) to light emitted by the illuminating source(s). For example, by using an improved light sensor(s), e.g., a more sensitive light sensor, the distance between two illuminating sources and/or the length of an elongated illuminating source may be shorter than 10 cm. In some embodiments, illuminating source 110 may illuminate at various wavelengths, for example, by illuminating at a wavelength between 900 nm and 1100 nm, may enable a light sensor to detect the illuminated light even in broad daylight. It should be noted that illuminating source 110 may illuminate at any desired wavelength, for example, according to requirements of the user such as, infra-red A, infra-red B and/or infra-red C on one end of the light spectrum, and/or UV on the other end of the light spectrum.

In some embodiments, system 100 may comprise at least one light sensor, e.g. light sensor 104 and/or light sensor 106, which may be mounted onto a headgear, such as helmet 130, at predetermined positions. The at least one light sensor may be positioned onto helmet 130, for example, positioned to receive an indication from a wide angle coverage from the front side of the user. Covering a wide angel in front of the user may enable the at least one light sensor to detect illuminating source 110, for example, when the user is holding firearm 150 in front of the user, such as in a firing position. In some embodiments, two light sensors may be used, for example, a first light sensor, e.g. light sensor 104 and a second light sensor, e.g. light sensor 106. For example, light sensor 104 may be positioned on a first side of helmet 130 and light sensor 106 may be positioned on a second side of helmet 130. The light sensors may be positioned on opposite sides of helmet 130, such that they may be located on each side of the face of the user. The at least one light sensor may be positioned to detect any light located and/or originated in the field of view of the at least one light sensor, for example, specifically light originating or being located in front of the user. Light sensor 104 and/or light sensor 106 may be able to detect and/or gather light parameters in a wide The Field of View (FOV), for example, 120° lateral and 120° longitudinal. The FOV of light sensors 104 and/or 106, may depend on the quality of the light sensors used. For example, using an improved light sensor(s) may enable a wider FOV, e.g., a wider lateral and/or longitudinal coverage. Each of the light sensors may have a wide FOV. For example, light sensor 104 may have a FOV, such as FOV 111, which may be able to detect light parameters generated, e.g., by illuminating sources 110. In some embodiments, multiple light sensors may be positioned to enable a broader and/or a complete coverage for detecting any light located and/or originated around the user's location, e.g., up to 360° lateral coverage and up to 360° longitudinal coverage.

Light sensors 104 and/or 106 may further detect and/or gather light parameters from a distance. An effective distance for detecting and/or gathering light parameters may depend on the illuminating intensity of the emitted light, for example, from an illuminating source, e.g., illuminating source 110 and/or any other illuminating source. For example, light sensors 104 and/or 106 may detect and/or gather light parameters of illuminating source 110 from a distance of up to 10 meters, for example, by presetting illuminating source 110 to illuminate at an illuminating intensity that may be detected from a distance of up to 10 meters. In other embodiments, light sensor 104 and/or 106 may detect light parameters of illuminating source 110 from other distances. The use of at least one light sensor, for example, light sensor 104 and/or light sensor 106, to detect and/or gather light parameters may be essential in achieving three-dimensional readings. In some embodiments, when using two light sensors 104 and 106, stereoscopic readings may be achieved. The essential detected and/or gathered light parameters may compose: light wavelengths, light polarization, light intensity level, light modulation, size of illuminating, source, shape and/or form of illuminating source, structure of illuminating source, number of illuminating sources or any combination. Processor 101, based on the detected and/or gathered parameters, for example, by the at least one light sensor, e.g., light sensor 104 and/or 106, may be able to generate three-dimensional readings. The light parameters detected and/or gathered by the light sensors 104 and/or 106, may enable a processor, e.g., processor 101, to calculate a three dimensional triangulation angle, a three dimensional trajectory and/or a three dimensional position of firearm 150 in space, for example, compared to a known predetermined position of light sensor 104 and/or light sensor 106. Calculating the position, triangulation angle and/or trajectory of firearm 150 may enable processor 101 to generate an accurate aiming vector, e.g. aiming vector 108. In some embodiments, using at least three illuminating sources may generate sufficient light parameters, which may enable processor 101 to generate three-dimensional readings, for example, by using only one light sensor.

In some embodiments, aiming vector 108 may be displayed onto a screen, such as screen 102. Screen 102 may be mounted onto a headgear, e.g., helmet 130, and may be positioned in front of at least one eye of the user. Screen 102 may be semi-transparent and/or a dichroic mirror and may enable the user to view therethrough, while displaying preselected features, for example, by using augmented realty technology, i.e., the screen may display background images, which may be positioned in the line of sight of the user. The preselected features that may be displayed onto screen 102 may include aiming vector 108, a compass, a distance range, ballistic correction range and/or other detected light parameters, e.g., allied forces, which may use a predetermined light signal to mark themselves. In some embodiments, other features may be displayed onto screen 102.

In some embodiments, the user may control the light intensity, so that the light emitted from the at least one illuminating source, may be detected by the light sensor(s), e.g., sensors 104 and/or 106, from a distance range of up to 10 meters. For example, when used solely by a single user the illuminating range of illuminating source 110 may not exceed 1 meter and may be adjusted for example, to overcome interference from other illuminating source(s).

In some embodiments, the at least one illuminating source may take many distinctive types of structures, shapes and/or forms, for example: elongated, oval, diamond, or any combination thereof. By having a distinctive structure, shape and/or form, the at least one illuminating source may enable the at least one light sensor to clearly detect its distinctive characteristics, such as structure, shape and/or form. By enabling the at least one light sensor to clearly detect the illuminating source characteristics, processor 101 may be able to calculate the triangulation vector of the firearm, for example, solely based on the light parameters received from the at least one illuminating source. For example, the light sensor may detect a certain shape of light emitted by a structured illuminating source. Processor 101, may then calculate the length and width of the detected shape, and compare the ratio between the length and the width of the detected light, to the predetermined parameters of the at least one structured illuminating source, and thus determine the angle of the firearm with respect to the light sensor.

Figure 2:
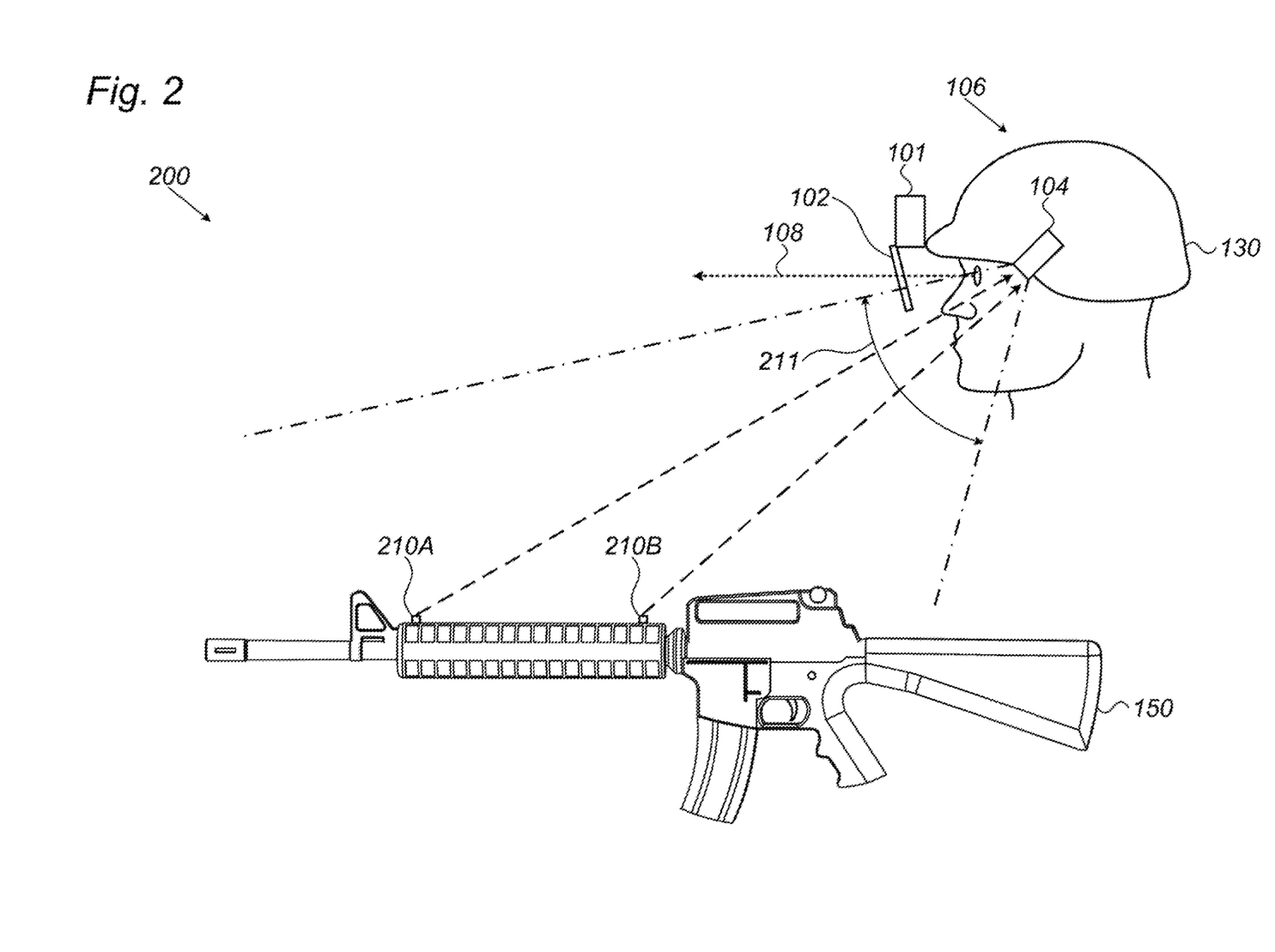
FIG. 2 is a schematic illustration of a side view of a system for displaying an aiming vector of a firearm, according to another embodiment of the present disclosure.

Reference is now made to FIG. 2, which is a schematic illustration of a side view of system 200 for displaying an aiming vector of a firearm, according to another embodiment of the present disclosure. In some embodiments, system 200 may operate while using two illuminating sources, e.g., illuminating source 210A and illuminating source 210B. For example, illuminating source 210A and illumination source 210B may be positioned along the longitudinal axis of the barrel of the firearm, for example, at a predetermined distance from each other. For example, a first illuminating source, e.g., illuminating source 210A may be positioned at the front end of the barrel, while a second illuminating source, such as illumination source 210B, may be positioned closer to a receiver of the firearm and/or on top of the upper receiver. In some embodiments, illuminating sources 210A and 210B may be positioned at different heights, i.e., the illuminating points may be located at different distances from the barrel of firearm 150. In some embodiments, illuminating sources 210A and 210B may be positioned at a predetermined distance from each other, such that when viewed, for example, by at least one light sensor, e.g., light sensor 104 and/or 106, the light sensor(s) may detect each illuminating source as a single point, and/or the distance between the illuminating sources. In some embodiments, the distance between illuminating sources 210A and 210B may be determined, for example, based on their predetermined illuminating intensity. For example, when illuminating sources 210A and 210B are set to illuminate at a low illumination intensity level, they may be positioned closer to each other, compared to when the illuminating sources are set to illuminate at a high illumination intensity level. For example, by illuminating at a low illumination intensity level, the light emitting from the first illuminating source, e.g., illuminating source 210A, may not interfere with the light emitted from the second illuminating source, e.g., illuminating source 210B, even when positioning the two illuminating sources in close proximity to one another. That is, light emitted from the second illuminating source may still be noticeable, while light is further emitted from the first illuminating source, due to the low illumination intensity level, which may enable to position the two illuminating sources in relatively close proximity from one to another. Illuminating at a low illumination intensity level may enable light sensors 104 and/or 106 to detect each illuminating source as a single point, for example, even when positioning the two illuminating sources substantially close to each other. However, when the illuminating sources are set to illuminate at a high illumination intensity level, the illuminating sources may be positioned farther away from one another, for example, at such a distance that the light emitting from the first illuminating source (e.g., illuminating source 210A) may not interfere the light emitted from the second illuminating source (e.g., illuminating source 210B) to be noticeable.

In some embodiments, the at least one light sensor may be a matrix Charged Coupled Device (CCD) light sensor and/or a PIN quadrant photodiode or any other type of sensor that is configured to detect illuminating light parameters, e.g., the angle at which light is illuminating with respect to the plane of the sensor. In some embodiments, light sensors 104 and/or 106 may be able to detect different light parameters, for example, light wavelengths, light intensity, light modulation or any combination thereof. Processor 101 may analyze the detected parameters, and may generate an aiming vector according to the analyzed parameters, e.g., aiming vector 108. In some embodiments, using at least three illuminating sources may generate sufficient light parameters, which may enable processor 101 to generate three-dimensional readings, for example by using only one light sensor.

Light sensors 104 and/or 106 may also have a wide FOV, such that each sensor may obtain parameters from each of the illuminating sources 210A and/or 210B. For example, light sensor 104 may have a FOV, such as FOV 211, which may be able to detect light parameters generated, e.g., by illuminating sources 210A and/or 210B. For example, the FOV of each of the light sensors 104 and/or 106 may be 120° lateral and 120° longitudinal. The FOV of light sensors 104 and/or 106, may depend on the quality of the light sensors used. For example, using an improved light sensor(s) may enable a wider FOV, e.g., a wider lateral and/or longitudinal coverage. In some embodiments, multiple light sensors may be positioned onto the headgear and/or other wearable element, to enable a broader and/or a complete coverage for detecting any light located and/or originated from any direction, e.g. up to 360° lateral coverage and up to 360° longitudinal coverage. Therefore, light sensors 104 and/or 106 may be able to monitor the movement of illuminating sources 210A and 210B, which may be mounted onto firearm 150 and/or collect any illuminating parameters generated by the illuminating source(s), e.g., to enable processor 101 to generate an aiming trajectory and/or an aiming vector of firearm 150. Illuminating sources 210A and 210B may generate different parameters, for example, illuminate at different wavelengths and/or different illuminating intensity, shaped, structured and/or formed differently, thereby enabling processor 101 to distinguish between the first and the second illuminating sources. By distinguishing between the first illuminating source, e.g., illuminating source 210A, and second illuminating source, e.g., illuminating source 210B, processor 101 may be able to better calculate the firing vector, e.g., even when holding the firearm parallel to and/or towards the user, i.e., sensors 104 and 106. For example, by preconfiguring processor 101 to identify first illuminating source, e.g., illuminating source 210A, as the illumination source closer to the front end of the firearm, and second illuminating source, e.g., illuminating source 210B as the illumining source closer to the middle and/or back end of the firearm.

In some embodiments, illuminating sources 210A and 210B may be mounted onto various elements of the firearm, e.g., as long as they remain visible to the at least one light sensor, such as a handguard, an iron sight, an upper and/or lower receiver and/or directly onto the barrel of the firearm or any combination thereof. For example, similar to the way an iron sight may be mounted onto a barrel of a firearm. The illuminating source(s) may illuminate at various wavelengths, for example between 900 nm and 1100 nm, which may enable the sensors to detect the illuminated light even in broad daylight. It should be noted that illuminating sources 210A and/or 210B may illuminate at any desired wavelength, for example, according to requirements of the user such as, infra-red A, infra-red B and/or infra-red C on one end of the light spectrum, and/or UV on the other end of the light spectrum. In some embodiments, illuminating source(s) such as illuminating source 110 and/or illuminating sources 210A and/or 210B may be a point light source, a LED based light source, a fluorescent light source, any other illuminating source or any combination thereof.

In some embodiments, systems 100 and/or 200 may be mounted onto and/or used with a variety of firearms, such as, pistols and/or handguns, shotguns, assault rifles, light machineguns, machineguns or any other firearm, and may be used by law enforcement personnel, soldiers and/or by users in the private sector.

In some embodiments, systems 100 and/or 200 may be water and/or dust proof, which may enable use of these systems in a variety of extreme conditions, such as, deserts, rainforests and/or underwater. In some embodiments illuminating source(s), e.g., illuminating source 110, illuminating sources 210A and/or illuminating sources 210B, light sensors, e.g., light sensor 104 and light sensor 106, processor 101 or screen 102 may be sealed, such to protect the electronic circuitry and sensors from water and/or dust. In some embodiments, power may be supplied to the illuminating source(s), light sensors, processor and/or screen by a rechargeable built-in battery. The battery may be recharged using a cable and/or wirelessly, e.g., by using inductive and/or conductive power transfer. The battery may be replaced, for example, by using designated tools and/or by a professional, ensuring the systems are properly sealed following replacement of the battery.

Figure 3:
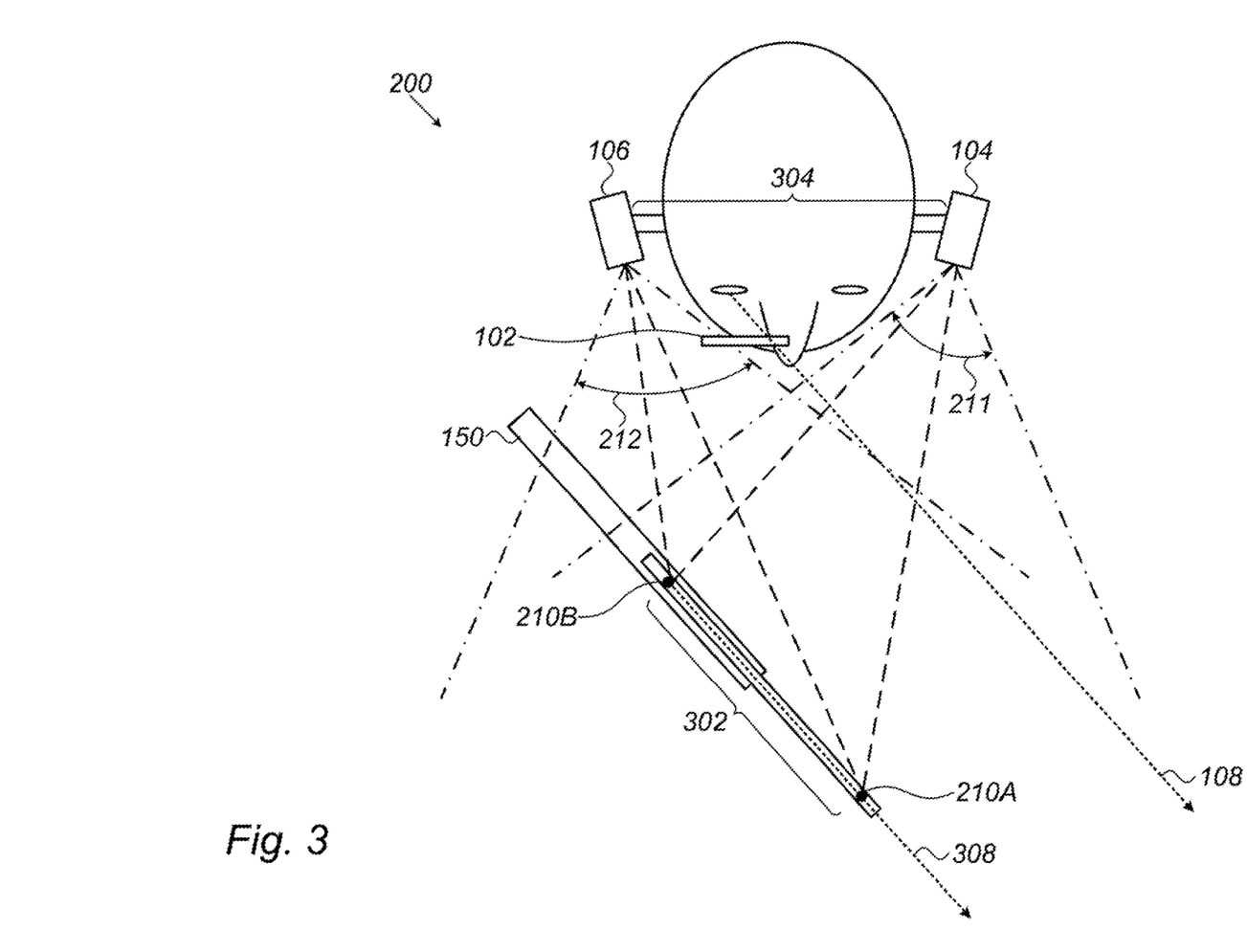
FIG. 3 is a schematic illustration of a top view of the system illustrated in FIG. 2, according to some embodiments of the present disclosure.

Reference is now made to FIG. 3, which is a schematic illustration of a top view of system 200 for displaying an aiming vector of a firearm illustrated in FIG. 2, according to some embodiments of the present disclosure. In some embodiments, system 200 may operate while using two illuminating sources, e.g., illuminating source 210A and illuminating source 210B. Illuminating sources 210A and 210B may be positioned at a predetermined distance from each other, for example, at predetermined distance 302. In some embodiments, processor 101 may generate the aiming vector 108 based on predetermined operational characteristics, for example a predetermined distance between light sensors. For example, processor 101 may generate aiming vector 108 based on the predetermined distance between light sensor 104 and light sensor 106, e.g., distance 304. For example, processor 101 may calculate the Cartesian coordinates, which may represent the position of the illuminating source(s) in space (as will be detailed with respect to FIGS. 5A-5B). For example, processor 101 may calculate the position of and/or the distance between illuminating source 210A and illuminating source 210B, which may be measured via light sensors 104 and 106, with respect to predetermined distance 304. By calculating the position and/or location of the two illuminating sources in space, processor 101 may determine and/or generate an aiming vector, e.g. vector 108. In some embodiments, predetermined distance 302 may enable at least one light sensor, such as light sensor 104 and/or light sensor 106 to better distinguish between first illuminating source 210A and second illuminating source 210B and/or to clearly distinguish their structure, shape and/or form. For example, distinguishing between the first and the second illuminating sources may be performed by ensuring that the light emitted from the first illuminating source may not interfere with the light emitted from the second illuminating source, and vice versa. As illustrated in FIG. 3, illuminating sources, 210A and 210B may be positioned onto firearm 150 such that they may form a line along the longitudinal axis of the barrel of firearm 150. The formed line may be aligned, for example, with an aiming and/or trajectory line of firearm 150, e.g. firing vector, aiming and/or trajectory line 308. Accordingly, the line formed between first illuminating source is 210A and second illuminating source 210B may reflect firing vector, aiming and/or trajectory line 308 of firearm 150. It should be noted that the at least one illuminating source(s) such as 110, 210A and/or 210B, may form and/or point to a "line" which may be aligned with aiming line 308 of firearm, for example, based on their characteristics, such as structure, shape and/or form. For example, the at least one illuminating source may be shaped as a rectangular and/or an oval, which may have a predetermined ratio between its length and width. By enabling the at least one light sensor to clearly detect the illuminating source characteristics, processor 101 may be able to calculate the triangulation vector of the firearm, for example, solely based on the light parameters received from the at least one illuminating source. For example, the light sensor may detect a certain shape structure and/or form of light emitted by a structured, shaped and/or formed illuminating source. Processor 101, may then calculate the length and width of the detected structure, shape and/or form, and compare the ratio between the length and the width of the detected light, to the predetermined parameters of the at least one structured, shaped and/or formed illuminating source. Thus, processor 101 may determine the angle of the firearm with respect to the light sensor and generate aiming vector 108 accordingly. For example, based on the predetermined ratio between length and width of the at least one illuminating source and/or the light parameters detected by the at least one light sensor, for example, light sensor 104 and/or 106.

In some embodiments, for example, when using two light sensors, such as light sensor 104 and/or 106, the two light sensors may be mounted onto a headgear, such as helmet 130. In some embodiments, light sensor 104 and 106 may be mounted onto the headgear at a predetermined distance from each other, for example, at distance 304. For example, sensor 104 may be positioned on a first side of helmet 130 and sensor 106 may be positioned on a second side of helmet 130. Each of the light sensors may have a wide field of view. For example, light sensor 104 may have a Field of View (FOV), such as FOV 211, which may be able to detect light parameters generated, e.g., by illuminating sources 210A and 210B. For example, firearm 150 may be positioned in front of a user such that illuminating sources 210A and 210B and/or illuminating source 110 may be located inside FOV 211. Processor 101, based solely on the parameters received from light sensor 104, may be able to generate a two and/or a three dimensional aiming vector. For example, based on the number of light parameters received, for example, wavelength, intensity level, light modulation, structure, shape and/or form of the at least one illuminating source, or any combination thereof. Similarly, light sensor 106 may have a similar FOV, such as FOV 212, which may be able to detect light parameters generated, e.g., by illuminating sources 210A and 210B and/or illuminating source 110, as disclosed above. In some embodiments, processor 101 may be preconfigured to include predetermined distance 304, and to generate based on the parameters received, e.g., from light sensors 104 and 106, an accurate three-dimensional aiming vector, such as aiming vector 108. According to some embodiments, by using at least two light sensors, and/or preprogramming processor 101 to include the distance between the light sensors, such as distance 304, processor 101 may be required to receive less light parameters in order to generate an accurate three dimensional aiming vector, for example from at least two light sensors, compared to when using a single light sensor. Aiming vector 108 may then be displayed onto screen 102, enabling the user to point firearm 150 at a required target, for example, without holding firearm 150 close to the face and/or aligning firearm 150 with the direct line of sight of the user.

In some embodiments, using systems 100 and/or 200 may generate an accurate aiming vector 108. The deviation of aiming vector 108 may be smaller than 1 milliradian. The accuracy of the generated aiming vector 108 may be better than most known systems, which typically use gyroscopes, since the accuracy level of gyroscopes is usually around 20 milliradian.

Figure 4A:
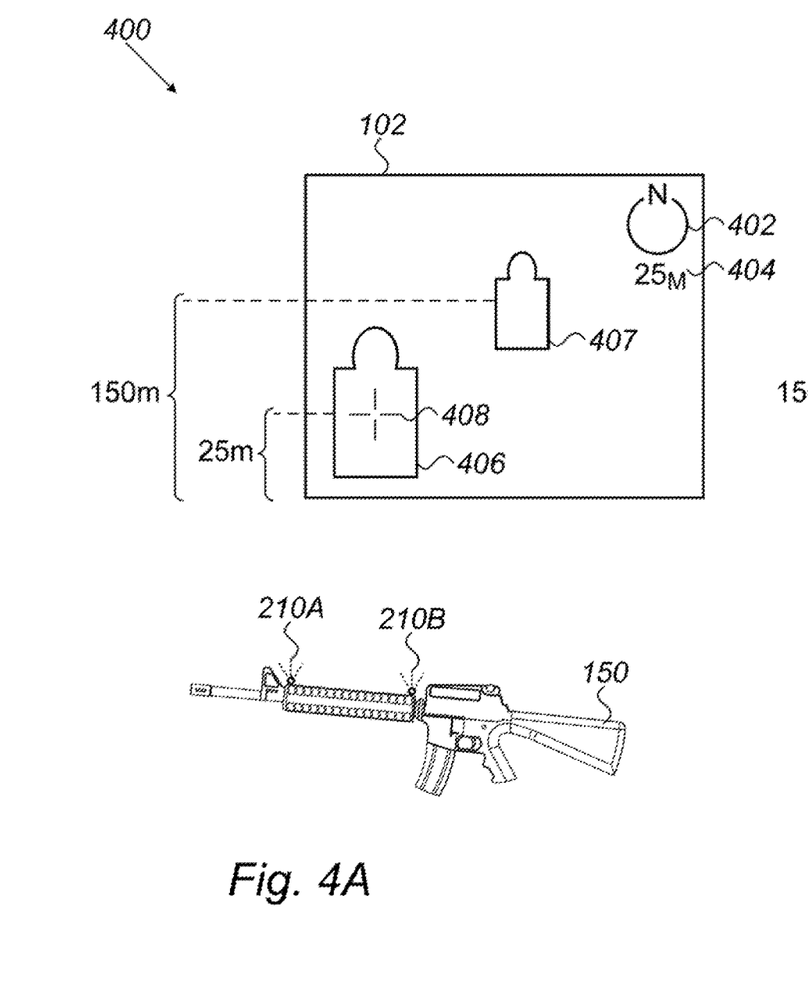
FIG. 4A is a schematic illustration of a view displayed to a user through a screen of a system for enabling a user to aim a firearm at a target located at a distance of about 25 meters away from the user, and display an aiming vector, according to some embodiments of the present disclosure.
Figure 4B:
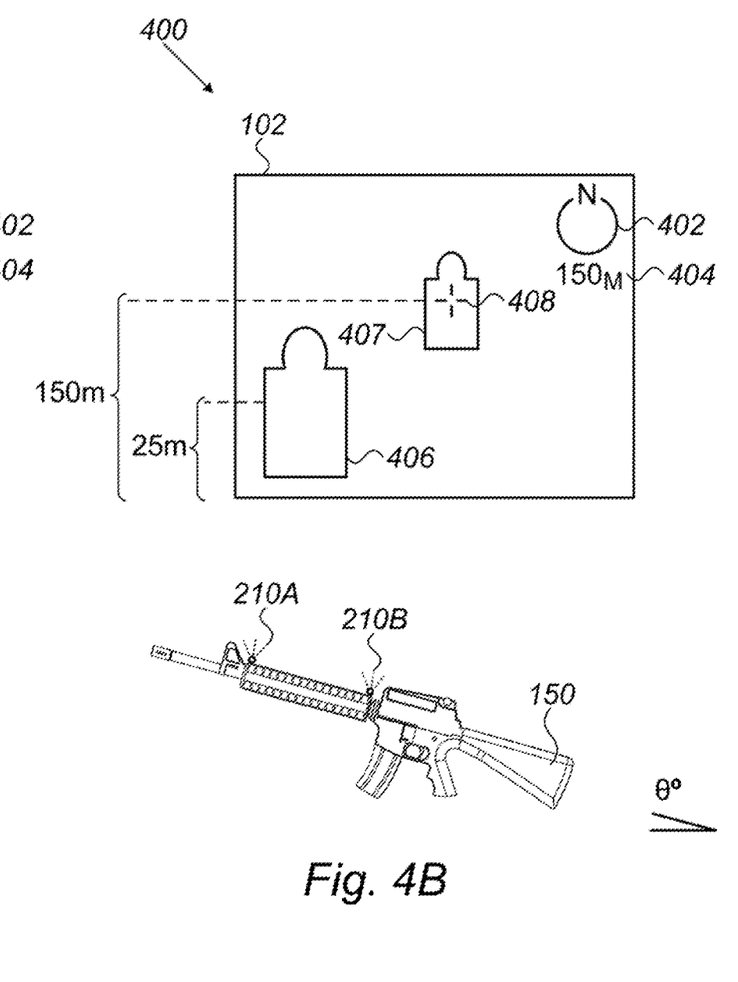
FIG. 4B is a schematic illustration of a view displayed to a user through a screen of a system for enabling a user to aim a firearm at a target located at a distance of about 150 meters away from the user, and display an aiming vector, according to some embodiments of the present disclosure.

Reference is now made to FIGS. 4A and 4B, which are schematic illustrations of a view displayed to a user through a screen of a system for enabling a user to aim a firearm at a target located at varying distances, and display an aiming vector, according to some embodiments of the present disclosure. In some embodiments, the view displayed to the user through a screen of a system for enabling a user to aim a firearm while holding the firearm away from their face, by using at least one illuminating point to acquire an aiming vector, may be, for example, view 400. In same embodiments, screen 102 may display aiming vector 108, for example, in the form of a cross and/or a dot, such as cross 408. In some embodiments screen 102 may display a compass, e.g., compass 402, an adjusted ballistic correction range, such as adjusted ballistic correction range 404, and/or other relevant data. In some embodiments, ballistic correction range 404, may present the distance, for example in meters, feet and/or yards, to which, processor 101 may calculate the automated correction range. For example, a user may insert a number of predetermined ranges and/or types of firearms, for example, via a turn of a knob, a push of a button and/or via a user interface, into processor 101. Processor 101 may then be able to generate an accurate aiming vector for example, based on the specification of the selected firearm with respect to each predetermined range. For example, configuring processor 101 to be adapted to an M-16 Assault Rifle (AF) may cause processor 101 to take into consideration the ballistics curve of the selected firearm when generating an aiming vector to a desired distance. In some embodiments, other relevant data that may be displayed onto screen 102 may comprise for example, data received from processor 101 and/or data detected by light sensors, such as light sensors 104 and/or 106. For example, detected allied forces, which may mark themselves, for example, by using an illuminating source, which may illuminate at a predetermined wavelength and/or intensity, may be displayed onto screen 102. In some embodiments, a user may be able to adjust the sights of the system, e.g., cross 408, to make sure that the aiming vector presented correlates with the aiming vector of the firearm. For example, the user may be able to adjust the displayed aiming vector, such as cross 408, according to the spotted firing results performed, for example, in a targeting range. For example, the user may be able to manually adjust aiming vector 108 and/or displayed cross 408, on screen 102, for example, by using knobs, buttons and/or via a user interface of processor 101 (not shown). For example, the user may manually adjust the aiming vector 108 and/or displayed cross 408, for example, by moving the displayed cross 408 in a lateral and longitudinal manner upon screen 102, i.e., move displayed cross 408 to the right, the left, up and/or down. In some embodiments, the user may manually adjust the aiming vector 108 and/or displayed cross 408, for example, by adjusting the location(s), position, structure, shape and/or form of the at least one illuminating source(s), such as 110, 210A and/or 210B, and/or adjusting distance 302. For example, based on the results performed by the user while firing firearm 150, for example, in a targeting range. In some embodiments, displayed aiming vector 108 and/or cross 408 may be automatically adjusted, for example, by processor 101, e.g., according to adjusted ballistic correction range, such to provide an automated firing angle correction.

In some embodiments, the user may insert technical specification, for example, of firearm 150, into processor 101, for example via user interface (not shown). By configuring processor 101 according to a firearm specification, processor 101 may be able to generate a customized aiming vector, for example, based on the requirements of the user, e.g., ballistic correction range. For example, the user may select to aim at a target located at a distance of 150 meters. By inserting the range, for example, via a turn of a knob, a push of a button and/or via a user interface, processor 101 may be able to generate an accurate aiming vector, which may be based, among other things, on the specification of the selected firearm. For example, configuring processor 101 to be adapted to an M-16 Assault Rifle (AF) may cause processor 101 to take into consideration the ballistics curve of the selected firearm when generating an aiming vector to a desired range. For example, FIGS. 4A and 4B illustrate a close target located at a distance of 25 meters, e.g., target 406, and a distant target located at a distance of 150 meters, e.g., target 407, respectively. In some embodiments, the user may select targeting target 406, which may require the user to hold a firearm at a lateral position. As illustrated in FIG. 4A, ballistic correction range 404 may be set to around 25 meters, which may enable the user to point firearm 150 to target 406, for example, based on aiming vector 108 and/or displayed cross 408. However, when the user selects targeting target 407, adjustment of aiming vector 108 and/or displayed cross 408 may be required. For example, as illustrated in FIG. 4B, ballistic correction range 404 may be set to around 150 meters, which may enable the user to select targeting target 407, for example, based on the corrected aiming vector 108 and/or displayed cross 408, which may require the user to point firearm 150 at an angle θ. The angle, e.g., angle θ, which may be required for positioning firearm 150 in order to set aiming vector to target 407, may be aligned automatically by the user, for example, as a result of selecting ballistic correction range 404.

Figure 5A:
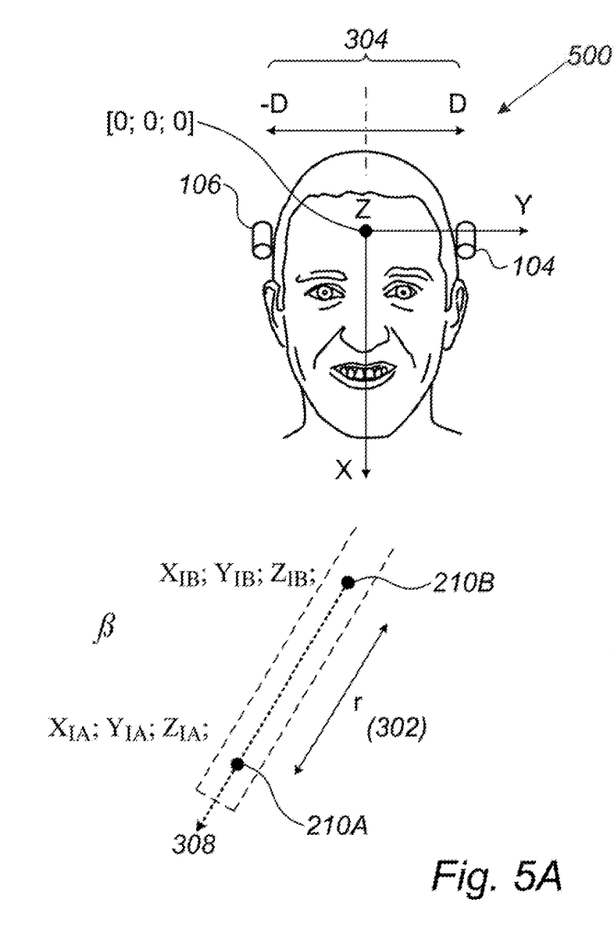
FIG. 5A is a schematic illustration of two illuminating points with respect to a user coordinates system for calculating an aiming vector of a firearm, according to embodiments of the present disclosure.
Figure 5B:
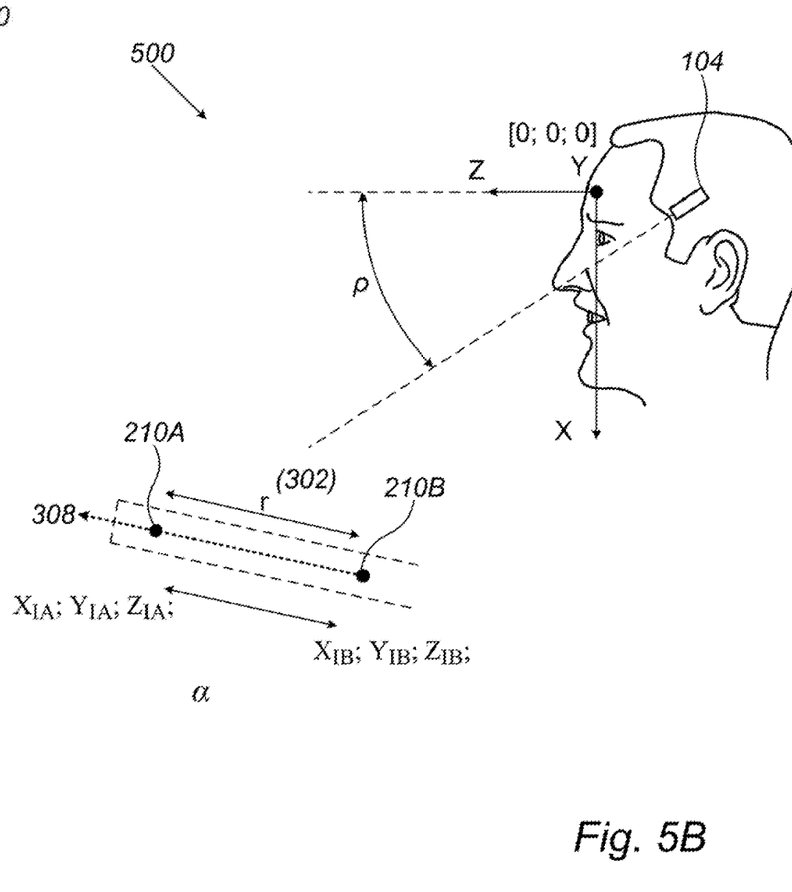
FIG. 5B is a schematic illustration of two illuminating points with respect to a user coordinates system for calculating an aiming vector of a firearm, according to embodiments of the present disclosure.

Reference is now made to FIGS. 5A and 5B, which are schematic illustrations of two illuminating points with respect to a user coordinates system for calculating an aiming vector of a firearm, according to embodiments of the present disclosure. In some embodiments, the user coordinates system for calculating an aiming vector of a firearm for enabling a user to aim a firearm, by using at least one light sensor and at least one illuminating point, may be, for example, user coordinates system 500. In some embodiments, processor 101 may calculate the position, triangulation angle and/or trajectory of firearm 150 based on the detected light parameters. For example, based on predetermined distance between at least two illumination sources and/or the length of one elongated illumination source, e.g., distance 302, predetermined distance between at least two light sensors, e.g., distance 304 and/or predetermined angle at which the light sensor(s) is located with respect to user coordinates system 500. In some embodiments, the angle of the light sensor(s) may dictate the FOV of the light sensor(s), such as FOV 211 of light sensor 104 and/or FOV 212 of light sensor 106. For example, processor 101 may set a user coordinates system. In some embodiments, user coordinates system 500 may be defined to be located at the center of the head of the user. For example, the origin of user coordinates system 500 may be set to be at a center point between the eyes of the user, e.g., user coordinates system 500 may be located at midpoint of distance 304.

In some embodiments, processor 101 may calculate the position, triangulation angle and/or trajectory of firearm 150 based on the detected light parameters. In some embodiments, processor 101 may compare at least one detected light parameter with at least one preconfigured light parameter. It should be noted that the at least one illuminating source(s) such as 110, 210A and/or 210B, may form a "line" which may be aligned with aiming line 308, e.g., of firearm 150, for example, based on their characteristics, such as structure, shape and/or form. For example, the at least one illuminating source may be shaped as a rectangular and/or an oval, which may have a predetermined ratio between its length and width. By enabling the at least one light sensor to clearly detect the illuminating source characteristics, processor 101 may be able to calculate the triangulation vector of the firearm, for example, solely based on the light parameters received from the at least one illuminating source. For example, the light sensor may detect a certain shape of light emitted by a structured, shaped and/or formed illuminating source. Processor 101, may then calculate the length and width of the detected structure, shape and/or form, and compare the ratio between the length and the width of the detected light, to the predetermined parameters of the at least one structured, shaped and/or formed illuminating source. Thus, processor 101 may determine the angle of the firearm with respect to the light sensor and generate aiming vector 108 accordingly. For example, processor 101 may compare the length, the width, structure, shape and/or form of illuminating source 110 with preconfigured parameters of illumination source 110. In some embodiments, processor 101 may compare at least one detected light parameter with at least one preconfigured light parameter based on light modulation. For example, processor 101 may compare the detected light parameters at one point in time with the detected light parameters received and/or analyzed in a different time interval, for example, in a previous time period. In some embodiments, the light intensity level of illuminating source 110 may be of different levels at different predefined time intervals. Processor 101, may analyze the detected light intensity level of illuminating source 110 and compare the detected intensity levels to those in predefined time intervals, in order to better track the position of illuminating source 110 in a three dimensional space.

In some embodiments, the Cartesian user coordinates system may be set to be at the center between the eyes of the user. For example, in user coordinates system 500, the 'Z' axis may face forward from the user, and may point at the same direction of the direct line of sight of the user. The 'Y' axis may extend in a lateral manner relative to the user, such as to point to a side of the user, for example, the left side of the user, whereas the 'X' axis may extend in a longitudinal manner relative to the user, for example, to point in a downwards direction. In some embodiments, processor 101 may set, the coordinates of illuminating source 210A to be represented via the coordinates of illuminating source 210B, in user coordinates system 500, as follows:

$$(X_{IA}, Y_{IA}, Z_{IA}) = (X_{IB}, Y_{IB}, Z_{IB}) + r^*(\cos(\beta)^*\sin(\alpha), \sin(\beta), \cos(\beta)^*\cos(\alpha)) \quad \text{(i)}$$

whereby,
r denotes distance 302;
$(X_{IA}, V_{IA}, Z_{IA})$ denotes the coordinates points of illumination source 210A (where 'I' and 'A' denotes "illumination" and illuminating source 210A, respectively);
$(X_{IB}, Y_{IB}, Z_{IB})$ denotes the coordinates points of illuminating source 210B (where 'I' and 'B' denotes "illumination" and illuminating source 210B, respectively);
α denotes the angle on the 'X' and 'Z' plane; and
β denotes the angle on the 'X' and 'Y' plane.

The coordinates may thus be defined accordingly:

$$X_{IA} = X_{IB} + r^*\cos(\beta)^*\sin(\alpha); \quad \text{(ii)}$$

$$Y_{IA} = Y_{IB} + r^*\sin(\beta); \quad \text{(iii)}$$

$$Z_{IA} = Z_{IB} + r^*\cos(\beta)^*\cos(\alpha). \quad \text{(iv)}$$

Figure 6:
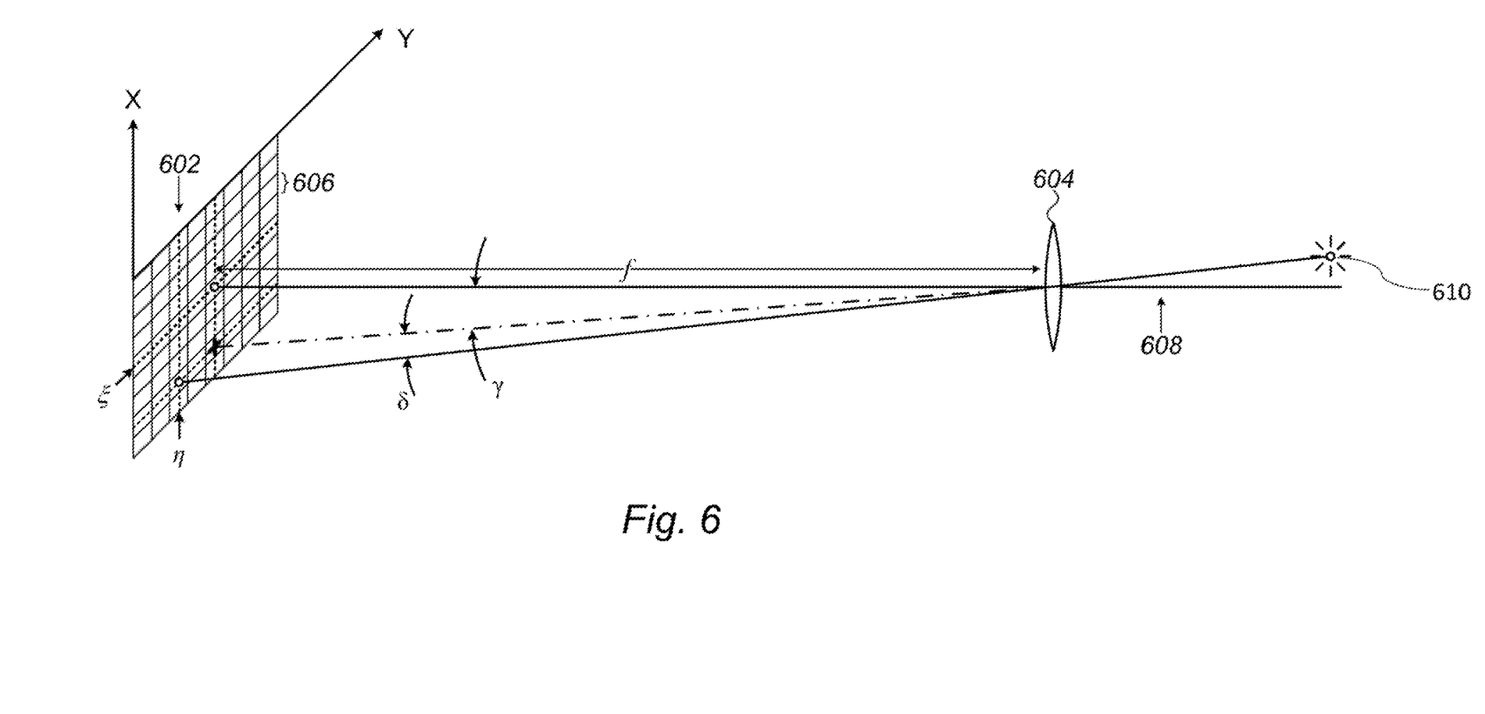
FIG. 6 is a schematic illustration of a Focal Plane Array (FPA) of a light sensor and the deviation of a light ray from a center line along the FPA, according to embodiments of the present disclosure.

For example, if firearm 150 may be aligned with the direct line of sight of the user, i.e., when α=0, β=0 (e.g, when firearm 150 is aligned along center ling 608, as illustrated in FIG. 6), the user coordinates points may be set as:

$$(X_{IA}, Y_{IA}, Z_{IA}) = (X_{IB}, Y_{IB}, Z_{IB}) + r^*(0,0,1) = (X_{IB}, Y_{IB}, Z_{IB} + r)$$

In some embodiments, light sensors 106 and 104 may be positioned along the 'Y' axis, for example, at a distance 'D' from the origin of user coordinates system 500, e.g., 'D' may be equal to half of distance 304. For example,
$(0, 0, 0)_{104} \rightarrow (0, D, 0)$;
$(0, 0, 0)_{106} \rightarrow (0, -D, 0)$.

Reference is now made to FIG. 6, which is a schematic illustration of a Focal Plane Array (FPA) of a light sensor and the deviation of a light ray from a center line along the FPA, according to embodiments of the present disclosure. According to the present invention, a light sensor may typically comprise an optical system, e.g., optical lens, such as lens 604, and an FPA, e.g., FPA 602. According to some embodiments, a center line 608 may be defined as a line located at the center of FPA 602 (e.g., at the center of 'X' axis and 'Y' axis). The location of the pixels along FPA 602, which detect light emitted from illuminating sources, e.g., illuminating source 610, may be calculated with respect to center line 608. In some embodiments, illuminating source 610 may be any one of illuminating sources 110, 210A and/or 210B, as detailed above (with respect to FIGS. 1, 2 and 3).

According to some embodiments, the location of each pixel of the FPA, e.g., FPA 602 may be defined as $(\xi, \eta, -f)$. Whereby, in some embodiments, '$\xi$' denotes the 'X' location value (in distance units) of each pixel, of FPA 602, for example, in the coordinates system of the light sensor(s). The 'X' value may be calculated by angle $\gamma$, e.g., the shift of angle $\gamma$ from center line 608, along the 'X-Y' plane of FPA 602. In some embodiments, $\xi$ may be acquired by multiplying the row number of the pixel by the width of the pixel, e.g. pitch 606, which may result in $\xi$ having the same value per each illuminating source that illuminates at the same row along FPA 602. In some embodiments, '$\eta$' denotes the 'Y' location value (in distance units) of each pixel, for example in the coordinates system of the light sensor(s). The 'Y' value may be calculated by angle $\delta$, e.g., the shift of angle $\delta$ from center line 608, along the 'X-Y' plane of FPA 602. In some embodiments, $\eta$ may be acquired by multiplying the column number of the pixel by the width of the pixel, pitch 606. In some embodiments, 'f' denotes the focal length of the optical system, e.g., lens 604.

In some embodiments, the FPA of light sensor 104 may be defined as $(\xi, \eta, -f)_{104}$ and the FPA of light sensor 106 may be defined as $(\xi, \eta, -f)_{106}$. In some embodiments, a distance 304 between light sensor 104 and light sensor 106 may be defined as 2D (FIG. 5A).

In some embodiments, the vector that originates from light sensor 104 towards illuminating source 210B may be defined as:

$$(X_{IB}, Y_{IB}, Z_{IB}) - (0, D, 0) \Rightarrow (X_{IB}, Y_{IB} - D, Z_{IB}) \qquad (v)$$

and the vector that originates from light sensor 104 towards illuminating source 210A may be defined as:

$$(X_{IA}, Y_{IA}, Z_{IA}) - (0, D, 0) \Rightarrow (X_{IA}, Y_{IA} - D, Z_{IA}). \qquad (vi)$$

Similarly, the vector that originates from light sensor 106 towards illuminating source 210B may be defined as:

$$(X_{IB}, Y_{IB}, Z_{IB}) - (0, -D, 0) \Rightarrow (X_{IB}, Y_{IB} + D, Z_{IB}) \qquad (vii)$$

and the vector that originates from light sensor 106 towards illuminating source 210A may be defined as:

$$(X_{IA}, Y_{IA}, Z_{IA}) - (0, -D, 0) \Rightarrow (X_{IA}, Y_{IA} + D, Z_{IA}). \qquad (viii)$$

In some embodiments, light sensors 104 and 106 may be positioned at an angle '$\rho$' relative to the 'Z-X' plane in user coordinates system 500. In some embodiments, angle '$\rho$' may dictate the angle at which the light sensor may be positioned, and thus the direction at which the FOV of the light sensor is directed at. For example, the coordinates of illumination source 210B per light sensor 104 in user coordinates system 500 may be defined as:

$$(X_{IB}\cos(\rho) + Z_{IB}\sin(\rho), Y_{IB} - D, Z_{IB}\cos(\rho) - X_{IB}\sin(\rho))_{104}. \qquad (ix)$$

Processor 101 may calculate which pixel on 'Z-X' plane of light sensors 104 and/or 106, may detect a light ray, originating from illuminating source 210A and/or 210B, in the FPA of the light sensor(s), e.g., FPA 602. For example, the pixel in light sensor 104 that may detect the light originating from illuminating source 210B may be calculated as follows:

$$\frac{f}{X_{IB}\sin(\rho) - Z_{IB}\cos(\rho)} = \frac{\xi_{B_{104}}}{X_{IB}\cos(\rho) + Z_{IB}\sin(\rho)} = \frac{\eta_{B_{104}}}{Y_{IB} - D} \qquad (x)$$

Therefore, the light ray may encounter the FPA of light sensor 104 at:

$$f\left(\frac{X_{IB}\cos(\rho) + Z_{IB}\sin(\rho)}{X_{IB}\sin(\rho) - Z_{IB}\cos(\rho)}, \frac{Y_{IB} - D}{X_{IB}\sin(\rho) - Z_{IB}\cos(\rho)}, -1\right)_{104} \qquad (xi)$$

Similarly, illumination source 210A may encounter the FPA of light sensor 104 at:

$$f\left(\frac{X_{IA}\cos(\rho) + Z_{IA}\sin(\rho)}{X_{IA}\sin(\rho) - Z_{IA}\cos(\rho)}, \frac{Y_{IA} - D}{X_{IA}\sin(\rho) - Z_{IA}\cos(\rho)}, -1\right)_{104} \qquad (xii)$$

In some embodiments, in user coordinates system 500, the pixel coordination on plane 'X-Y' per any pixel (i) may be defined as: $\xi, \eta_{104} + D, -f)_{(i)}$ and $(\xi, \eta_{106} - D, -f)_{(i)}$, per light sensors 104 and 106, respectively. Therefore, processor 101 may calculate a location of an illuminating source, for example, by calculating the intersection point of inverse trajectory lines of light rays detected by each of light sensors 104 and 106. The light rays may be represented as follows: per a light ray that is detected by light sensor 104:

$$(0, D, 0) + \{(\xi, \eta_{104} + D, -f) - (0, D, 0)\}\alpha \Rightarrow (0, D, 0) + (\xi, \eta_{104}, -f)\alpha \qquad (xiii)$$

per a light ray that is detected by light sensor 106:

$$(0, -D, 0) + (\xi, \eta_{106}, -f)\beta \qquad (xiv)$$

Since the pixels may be illuminated by the same illuminating source, based on the 'X', 'Y' and 'Z' coordinates and since $\alpha$ may be equal to $\beta$ at the intersection point, the coordinates of the illuminating source may be represented as follows:

$$(0, D, 0) + (\xi, \eta_{104}, -f)\frac{2D}{\eta_{106} - \eta_{104}} = \qquad (xv)$$

$$\left(\frac{2D\xi}{\eta_{106} - \eta_{104}}, \frac{2D\eta_{106}}{\eta_{106} - \eta_{104}} + D, \frac{-2Df}{\eta_{106} - \eta_{a104}}\right)_i.$$

In some embodiments, for example, after reorganizing the 'Y' coordinate, the coordinates of the illuminating source may be represented as follows:

$$\frac{D}{\eta_{106} - \eta_{104}} (2\xi, \eta_{104} + \eta_{106}, -2f)_i. \quad \text{(xvi)}$$

In some embodiments, the $\xi$ coordinates of illuminating source 210B may be greater than those of illuminating source 210A, e.g., $\xi_B > \xi_A$, and the vector stretched between illuminating source 210B and 210A may be represented as follows:

$$'X' = 2D\left(\frac{\xi_A}{\eta_{106A} - \eta_{104A}} - \frac{\xi_B}{\eta_{106B} - \eta_{104B}}\right) \quad \text{(xvii)}$$

$$'Y' = D\left(\frac{\eta_{104A} + \eta_{106A}}{\eta_{106A} - \eta_{104A}} - \frac{\eta_{104B} + \eta_{106B}}{\eta_{106B} - \eta_{104B}}\right) \quad \text{(xviii)}$$

$$'Z' = 2fD\left(\frac{1}{\eta_{106B} - \eta_{104B}} - \frac{1}{\eta_{106A} - \eta_{104A}}\right). \quad \text{(xix)}$$

Therefore, in user coordinates system 500 the vector stretched between illuminating source 210B and 210A, e.g., aiming line or aiming vector 308, may be represented as follows:

$$\alpha_i = \arctan\left(\frac{\frac{\xi_A}{\eta_{106A} - \eta_{104A}} - \frac{\xi_B}{\eta_{106B} - \eta_{104B}}}{\frac{f}{\eta_{106B} - \eta_{104B}} - \frac{f}{\eta_{106A} - \eta_{104A}}}\right) = > \quad \text{(xx)}$$

$$\alpha_i = \arctan\left(\frac{\xi_A(\eta_{106B} - \eta_{104B}) - \xi_B(\eta_{106A} - \eta_{104A})}{f(\eta_{106A} - \eta_{104A}) - f(\eta_{106B} - \eta_{104B})}\right) = >$$

$$\alpha_i = \arctan\left(\frac{\xi_2(\eta_{106B} - \eta_{104B}) - \xi_B(\eta_{106A} - \eta_{104A})}{f(\eta_{106A} - \eta_{106B} + \eta_{104B} - \eta_{104A})}\right)$$

$$\beta_i = \arctan\left(\frac{'Y' \text{component}}{\text{Disatance between illuminating sources}}\right) = > \quad \text{(xxi)}$$

$$\beta_i = \arctan\left(\frac{D}{r}\left(\frac{\eta_{104A} + \eta_{106A}}{\eta_{106A} - \eta_{104A}} - \frac{\eta_{104B} + \eta_{106B}}{\eta_{106B} - \eta_{104B}}\right)\right)$$

whereby, $\alpha_i$ denotes the angle on the 'X' and 'Z' plane in the firearm coordinates system ('i' is shortcut for 'illumination', since the illuminating sources are located along the firearm coordinates system); and $\beta_i$ denotes the angle on the 'X' and 'Y' plane in the firearm (illumination) coordinates system.

In some embodiments, when transferring to user coordinates system 500 angle $\beta_i$ may stay the same, while angle $\alpha$ may shift by $\rho$, which may create the following shifts to angles $\alpha_i$ and $\beta_i$:

$$\alpha_U = \alpha_i - \rho = \arctan\left(\frac{\xi_B(\eta_{106B} + \eta_{104B}) - \xi_A(\eta_{106A} - \eta_{104A})}{f(\eta_{106A} - \eta_{106B} + \eta_{104B} - \eta_{104A})}\right) - \rho \quad \text{(xxii)}$$

$$\beta_U = \beta_i = \arctan\left(\frac{D}{r}\left(\frac{\eta_{104A} + \eta_{106A}}{\eta_{106A} - \eta_{104A}} - \frac{\eta_{104B} + \eta_{106B}}{\eta_{106B} - \eta_{104B}}\right)\right) \quad \text{(xxiii)}$$

whereby, $\alpha_U$ and $\beta_U$ denote the angels $\alpha$ and $\beta$, in User coordinates system 500, respectively.

Therefore, the user coordinates of illuminating source 210A ($X_{IA}$, $Y_{IA}$, $Z_{IA}$) and illuminating source 210B ($X_{IB}$, $Y_{IB}$, $Z_{IB}$), for example, based on the presented calculations may be represented as follows:

$$\xi_B = f\frac{X_{IB}\cos(\rho) + Z_{IB}\sin(\rho)}{X_{IB}\sin(\rho) - Z_{IB}\cos(\rho)} \quad \text{(xxiv)}$$

$$\xi_A = f\frac{(X_{IB} + r\cos(\beta)\sin(\alpha))\cos(\rho) + (Z_{IB} + r\cos(\beta)\cos(\alpha))\sin(\rho)}{(X_{IB} + r\cos(\beta)\sin(\alpha))\sin(\rho) - (Z_{IB} + r\cos(\beta)\cos(\alpha))\cos(\rho)} \quad \text{(xxv)}$$

$$\eta_{B104} = f\frac{Y_{i_1} - D}{X_{IB}\sin(\rho) - Z_{IB}\cos(\rho)} \quad \text{(xxvi)}$$

$$\eta_{A104} = f\frac{Y_{IB} + r*\sin(\beta) - D}{(X_{IB} + r\cos(\beta)\sin(\alpha))\sin(\rho) - (Z_{IB} + r\cos(\beta)\cos(\alpha))\cos(\rho)} \quad \text{(xxvii)}$$

$$\eta_{B106} = f\frac{Y_{IB} + D}{X_{IB}\sin(\rho) - Z_{IB}\cos(\rho)} \quad \text{(xxviii)}$$

$$\eta_{A106} = f\frac{Y_{IB} + r*\sin(\beta) + D}{(X_{IB} + r\cos(\beta)\sin(\alpha))\sin(\rho) - (Z_{IB} + r\cos(\beta)\cos(\alpha))\cos(\rho)} \quad \text{(xxix)}$$

Figure 7:
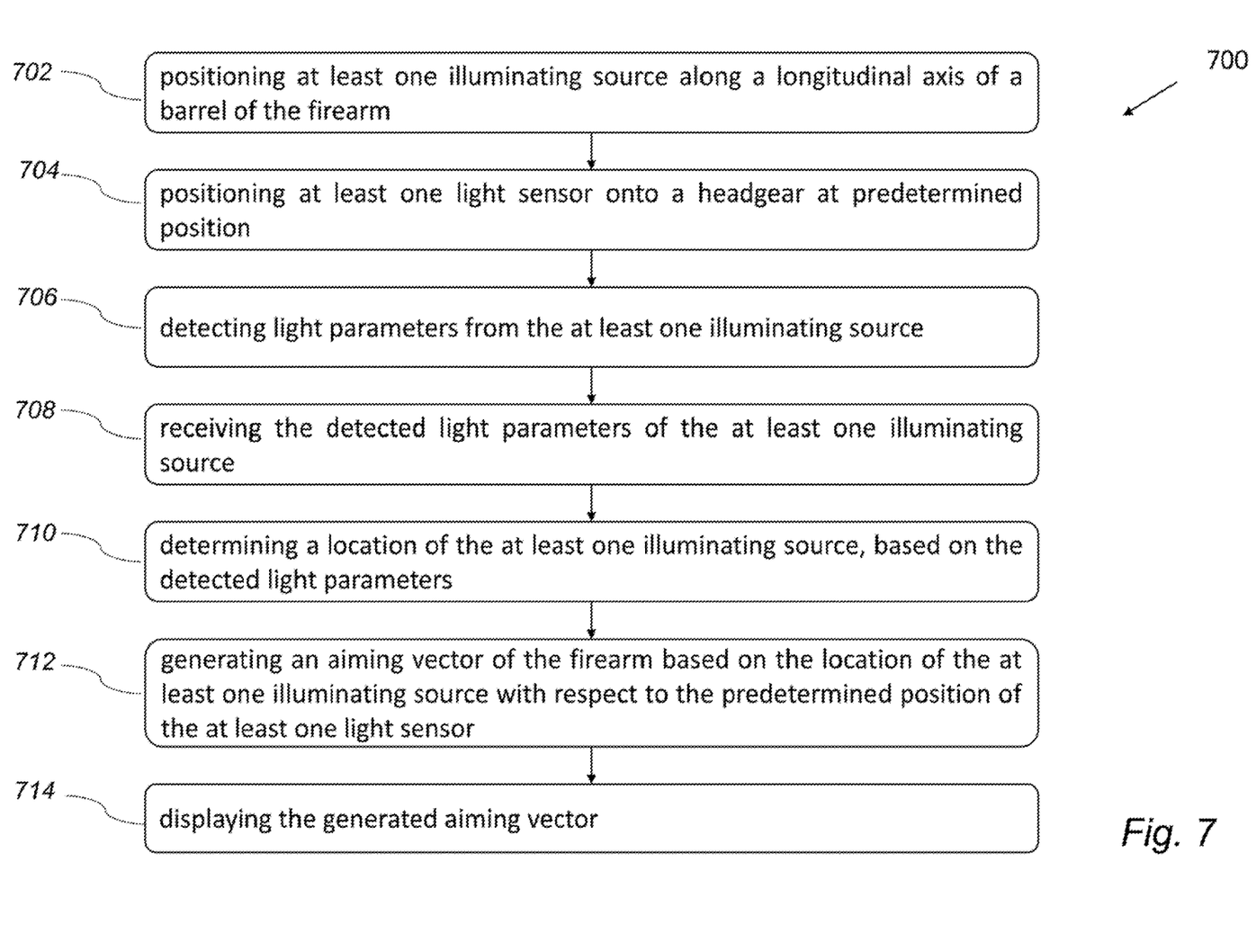
FIG. 7 is a schematic flowchart illustrating a method for displaying an aiming vector of a firearm, according to some embodiments of the present disclosure.

Reference is now made to FIG. 7, which is a schematic flowchart illustrating a method for displaying an aiming vector of a firearm, according to some embodiments of the present disclosure. In some embodiments, a method for displaying an aiming vector of a firearm may be, for example, method 700. As indicated in operation 702, method 700 may require positioning at least one illuminating source along a longitudinal axis of a barrel of the firearm for example, by the user (and/or a specialist who specializes in firearm adjustments). Illuminating source(s) 110 and/or 210A and 210B, may be positioned along and/or in parallel to the barrel of firearm 150, i.e., parallel to the firing trajectory, e.g., firing vector and/or aiming line 308, and may be mounted onto various elements of the firearm, as detailed above (with respect to FIGS. 1, 2 and 3). As indicated in operation 704, method 700 may require positioning at least one light sensor, e.g., light sensors 104 and/or 106, onto a headgear, e.g. helmet 130, at predetermined position. In some embodiments, two light sensors, e.g., light sensors 104 and 106 may be positioned at a predetermined distance from each other, for example, distance 304. Light sensors 104 and/or 106 may be positioned such that they may detect light parameters and/or receive indication from the illuminating source(s), which may be positioned in front of a user, and therefore in front of the light sensor(s). The at least one illuminating source may illuminate at a predetermined wavelength and/or intensity such that the at least one illuminating source may be detected by the at least one light sensor. For example, when a user holds firearm 150, which may comprise at least one illuminating source, such as illuminating source(s) 110 and/or 210A and 210B, for example, in a firing position, such to aim at a target located in front of the user, light sensors 104 and/or 106 may detect illuminating source(s) 110 and/or 210A and 210B. As indicated in operations 706, the at least one light sensor, may detect light parameters, which may origin from the at least one illuminating source, e.g., illuminating source(s) 110 and/or 210A and 210B.

As indicated in operations 708 and 710, processor 101 may receive, for example, from the at least one light sensor, detected light parameters, which may origin from the at least one illuminating source(s). Processor 101, may be preprogrammed to include the position of the at least one light sensor, e.g., light sensors 104 and/or 106, for example, the location of the light sensors on the headgear and/or with respect to each other. Processor 101 may determine a location of the at least one illuminating source, for example, based on the detected and/or received light parameters. The detected light parameters, which may comprise, for example, light wavelengths, light polarization, light intensity, light modulation, size of illuminating source, shape of illuminating source, number of illuminating sources or any combination thereof, may enable processor 101, to calculate a triangulation angle, trajectory and/or position of the at least one illuminating source(s). As indicated in operations 712, processor 101 may generate an aiming vector of the firearm, e.g., aiming vector 108, for example, based on the location and/or light parameters of the at least one illuminating source(s) detected. For example, processor 101 may generate an aiming vector based on light parameters of illuminating source(s) 110 and/or 210A and 210B, with respect to a predetermined position of the at least one light sensor, such as light sensor 104 and/or 106. By calculating the triangulation of the at least one illuminating source(s) and by preprogramming processor 101 to include the position of the at least one illuminating source(s) with respect to each other and/or with respect to firearm 150, processor 101 may calculate the position, triangulation angle and/or trajectory of firearm 150. Calculating the position, triangulation angle and/or trajectory of firearm 150 may enable processor 101 to generate an accurate aiming vector 108. Once processor 101 generated an accurate aiming vector, such as aiming vector 108, it may display aiming vector 108 onto screen 102, e.g., via cross 408, as indicated in operation 714.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor', or system thereof, are used herein as ordinary context of the art, such as a general purpose processor, or a portable device such as a smart phone or a tablet computer, or a micro-processor, or a RISC processor, or a DSP, possibly comprising additional elements such as memory or communication ports. Optionally or additionally, the terms 'processor' or derivatives thereof denote an apparatus that is capable of carrying out a provided or an incorporated program and/or is capable of controlling and/or accessing data storage apparatus and/or other apparatus such as input and output ports. The terms 'processor' denote also a plurality of processors or computers connected, and/or linked and/or otherwise communicating, possibly sharing one or more other resources such as a memory.

The processor may constitute an array of electronic gates, such as FPGA or ASIC, designed to perform a programmed sequence of operations, optionally comprising or linked with a processor or other circuitry.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprising", "including" and/or "having" and other conjugations of these terms, when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A system for displaying an aiming vector of a firearm to a user, the system comprising:
    at least one illuminating source, positioned along a longitudinal axis of a barrel of the firearm;
    at least one light sensor, mounted onto a headgear at a predetermined position, configured to detect light parameters from the at least one illuminating source;
    a display unit designed to be mounted onto the headgear; and
    a processor, configured to:
        (i) receive the detected light parameters of the at least one illuminating source;
        (ii) determine a location of the at least one illuminating source, based on the detected light parameters; and
        (iii) generate an aiming vector of the firearm based on the location of the at least one illuminating source with respect to the predetermined position of the at least one light sensor;
    wherein the display unit is configured to display the aiming vector generated by the processor.

2. The system of claim 1, further comprising a second illuminating source positioned along a longitudinal axis of a barrel of the firearm, at a predetermined distance from the at least one illuminating source.

3. The system of claim 1, further comprising a second light sensor mounted at a predetermined distance from the at least one light sensor onto a headgear, configured to detect light parameters from the at least one illuminating source.

4. The system of claim 1, wherein the at least one illuminating source is an elongated illuminating source, positioned along a longitudinal axis of a barrel of the firearm.

5. The system of claim 1, wherein the at least one illuminating source has a distinctive form or structure such that, the at, least one light sensor is able to detect the form or structure of the at least one illuminating source.

6. The system of claim 1, wherein the light parameters include light intensity, light wavelengths, light, polarization, size, of illuminating source, shape of illuminating source, number of illuminating sources, light modulation or any combination thereof.

7. The system of claim 1, wherein the at least one illuminating source illuminates light at a wavelength between 900 nm and 1100 nm.

8. The system of claim 7, wherein the light wavelength of the at least one illuminating source is set by the user.

9. The system of claim 1, wherein light intensity of the at least one illuminating source is set by the user.

10. The system of claim 9, wherein the light intensity of the at least one illuminating source is detected from a distance of at up to 10 meters.

11. The system of claim 7, wherein the processor is further configured to generate different aiming vectors based on different wavelengths of different illuminating sources.

12. The system of claim 11, wherein the display unit is further configured to display the different aiming vectors.

13. The system of claim 3, wherein the at least two light sensors are positioned on opposite sides of the headgear.

14. The system of claim 1, wherein the headgear is a helmet.

15. A method for displaying an aiming vector of a firearm to user, the method comprising:
   positioning at least one illuminating source along a longitudinal axis of a barrel of the firearm;
   positioning at least one light sensor onto a headgear at a predetermined position;
   detecting light parameters from the at least, one illuminating source;
   receiving the detected light parameters of the at least one illuminating source;
   determining a location of the at least one illuminating source, based on the detected light parameters;
   generating an aiming vector of the firearm based on the location of the at least one illuminating source with respect to the predetermined position of the at least one light sensor; and
   displaying the generated aiming vector.

16. The method of claim 15, wherein further positioning a second illuminating source along a longitudinal axis of a barrel of the firearm, at a predetermined distance from the at least one illuminating source.

17. The method of claim 15, wherein the at least one illuminating source is an elongated illuminating source, positioned along a longitudinal axis of a barrel of the firearm.

18. The method of claim 15, further positioning a second light sensor at a predetermined distance from the at least one light sensor.

19. The method of claim 18 wherein the second light sensor and the at least one light sensor are positioned at a predetermined distance from each other on opposite sides of the headgear.

20. The method of claim 15, wherein the light parameters include light modulation, light intensity, light wavelengths or any combination thereof.

* * * * *